(12) United States Patent
Vice et al.

(10) Patent No.: US 9,418,067 B1
(45) Date of Patent: Aug. 16, 2016

(54) SYSTEMS AND METHODS FOR METADATA-BASED WORKFLOWS FOR CONTENT CREATION AND MEDIA DISTRIBUTIONS

(71) Applicant: Foto-Kem Industries, Inc., Burbank, CA (US)

(72) Inventors: Thomas J. Vice, Burbank, CA (US); Freddy Goeske, Calabasas, CA (US); Mark A. Gallegly, Burbank, CA (US); Michael B. Brodersen, Agoura Hills, CA (US)

(73) Assignee: Foto-Kem Industries, Inc., Burbank, CA (US)

( * ) Notice: Subject to any disclaimer, the term of this patent is extended or adjusted under 35 U.S.C. 154(b) by 301 days.

(21) Appl. No.: 14/136,167

(22) Filed: Dec. 20, 2013

Related U.S. Application Data

(63) Continuation of application No. 13/528,778, filed on Jun. 20, 2012, now Pat. No. 8,615,517.

(60) Provisional application No. 61/498,917, filed on Jun. 20, 2011.

(51) Int. Cl.
G06F 17/30 (2006.01)

(52) U.S. Cl.
CPC ...... *G06F 17/30017* (2013.01); *G06F 17/3007* (2013.01); *G06F 17/30345* (2013.01)

(58) Field of Classification Search
None
See application file for complete search history.

(56) References Cited

U.S. PATENT DOCUMENTS

| | | |
|---|---|---|
| 5,557,423 A | 9/1996 | Phillips et al. |
| 5,627,936 A | 5/1997 | Prasad et al. |
| 5,717,815 A | 2/1998 | Nakano et al. |
| 5,745,637 A | 4/1998 | Phillips et al. |
| 5,765,164 A | 6/1998 | Prasad et al. |
| 5,982,447 A | 11/1999 | Nakamura |
| 6,317,191 B1 | 11/2001 | James et al. |
| 6,393,198 B1 | 5/2002 | LaMacchia |
| 6,442,573 B1 | 8/2002 | Schiller et al. |
| 6,546,190 B1 | 4/2003 | Phillips et al. |
| 6,573,907 B1 | 6/2003 | Madrane |
| 6,643,652 B2 | 11/2003 | Helgeson et al. |
| 6,957,199 B1 | 10/2005 | Fisher |
| 7,039,655 B2 | 5/2006 | Kapczynski et al. |

(Continued)

OTHER PUBLICATIONS

Office Action in U.S. Appl. No. 13/528,778 dated Sep. 11, 2013.

*Primary Examiner* — Debbie Le
(74) *Attorney, Agent, or Firm* — Greenberg Traurig, LLP; David J. Dykeman

(57) ABSTRACT

A secure networked metadata-based workflow method and system, managed through core application logic and master database management system for picture, sound, and metadata acquisition, and ancillary production and post production data and metadata collection and creation, in the processes of motion picture production and post production file-based workflows; asset file management, asset file manipulation, asset file distribution, asset file archiving, remote creative and collaborative interchange, project administration, project reporting, and more, across multiple venues and platforms for efficient and simultaneous access to production data files, and master archive, in application to: remote project administration, dailies creation, project metadata tracking, post production ingest and processing, asset management and archive, distribution of executive review elements, and product finishing and archive, in 2D and 3D content creation, as examples.

45 Claims, 15 Drawing Sheets

(56) References Cited

U.S. PATENT DOCUMENTS

| | | |
|---|---|---|
| 7,095,871 B2 | 8/2006 | Jones et al. |
| 7,130,885 B2 | 10/2006 | Chandra et al. |
| 7,864,211 B2 | 1/2011 | Mowry |
| 7,897,865 B2 | 3/2011 | Uehara |
| 8,199,211 B2 | 6/2012 | Wayne et al. |
| 8,271,336 B2 | 9/2012 | Mikurak |
| 8,296,801 B2 | 10/2012 | Takagi et al. |
| 8,332,478 B2 | 12/2012 | Levy et al. |
| 8,378,199 B2 | 2/2013 | Uehara |
| 8,392,532 B2 | 3/2013 | Wood et al. |
| 8,464,154 B2 | 6/2013 | Herberger et al. |
| 8,615,517 B1 | 12/2013 | Vice et al. |
| 2002/0033844 A1 | 3/2002 | Levy et al. |
| 2002/0078446 A1 | 6/2002 | Dakss et al. |
| 2002/0138582 A1 | 9/2002 | Chandra et al. |
| 2002/0141584 A1 | 10/2002 | Razdan et al. |
| 2002/0188841 A1 | 12/2002 | Jones et al. |
| 2003/0085997 A1 | 5/2003 | Takagi et al. |
| 2003/0158960 A1 | 8/2003 | Engberg |
| 2003/0177187 A1 | 9/2003 | Levine et al. |
| 2004/0064351 A1 | 4/2004 | Mikurak |
| 2006/0098973 A1 | 5/2006 | Verdier |
| 2006/0129917 A1 | 6/2006 | Volk et al. |
| 2007/0130177 A1 | 6/2007 | Schneider et al. |
| 2009/0086100 A1 | 4/2009 | Pines et al. |
| 2009/0231459 A1 | 9/2009 | Wayne et al. |
| 2011/0026900 A1* | 2/2011 | Lussier ............ G11B 27/034 386/281 |
| 2011/0184964 A1 | 7/2011 | Li |
| 2012/0144302 A1 | 6/2012 | Campanotti et al. |

* cited by examiner

SYSTEMS AND METHODS FOR METADATA-BASED WORKFLOWS FOR CONTENT CREATION AND MEDIA DISTRIBUTIONS

RELATED APPLICATIONS

This application is a continuation of U.S. application Ser. No. 13/528,778, filed on Jun. 20, 2012, which claims the benefit of and priority to U.S. Provisional Application No. 61/498,917, filed Jun. 20, 2011, the disclosures of each application are incorporated herein by reference in their entirety.

FIELD

At least some embodiments disclosed herein relate, in general, to systems and methods for a metadata-based workflow for the management and processing of various data file elements produced by various acquisition and content creation devices in the processes of motion picture, television, and commercial production and post production.

BACKGROUND

Since the advent of digital production tools for motion picture, television, and commercial production, the industry has experienced a number of changes in content creation methodology. This began with the implementation of digital camera systems that recorded camera output to various tape formats (replacing film) and utilizing similar workflow methods as film production. As technologies advanced in the areas of digital imaging, compression codecs, and computer processing, more efficient file-based production and post production workflows followed. File based workflows today encompass both production and post production processes. However these processes are considered distinctly separate, primarily because there has been to date no effective system or process to efficiently bridge the gap from the production location to the various post production venues involved in finishing content.

SUMMARY

In various embodiments, the present disclosure provides a method, apparatus and system for the networked integration of metadata-based workflows in file-based production and post production processes for motion picture content creation. A networked solution can effectively bridge the divide between production and the varied processes of post production by enabling efficient (timely) and secure file access to production assets for collaborative interchange and post processing. In various embodiments, a metadata-based workflow utilizes abstract representations (including metadata) of source media, or combinations of source media, as objects, for more efficient platform interchange, creative and objective workflow manipulation, and process management.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

Figure 1:
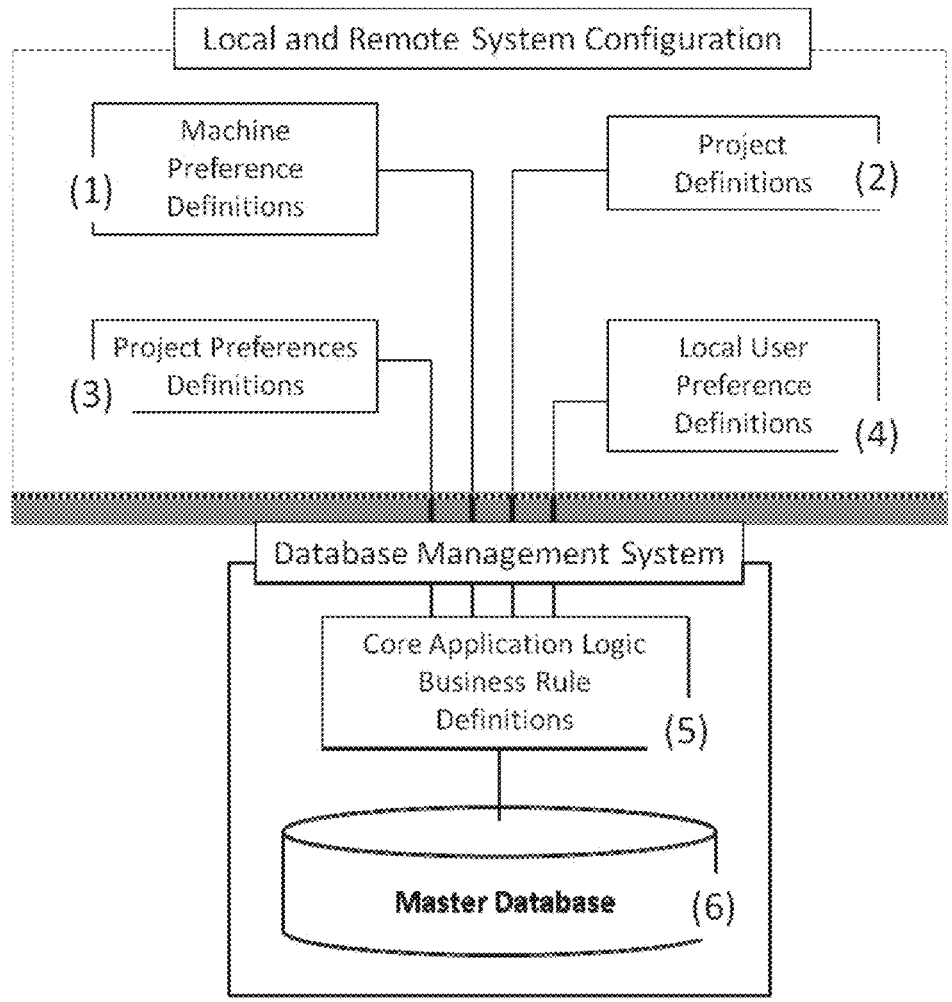
FIG. 1 is a block diagram of an embodiment of a networked asset management and project administration system employing a core application logic and database management system, in accordance with the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art that fall within the scope and spirit of the principles of the presently disclosed embodiments.

DETAILED DESCRIPTION

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

In various embodiments, the present disclosure relates to systems and methods for utilizing metadata-based workflows for motion picture, television, and commercial production For the purposes of this disclosure, the term "metadata-based workflow" should be understood to refer to the application, control and audit of objective and creative actions on visual and audible media using specialized metadata objects to define and control aspects of underlying source data, or exact representative versions of the source data across a variety of systems and platforms.

In at least some embodiments, in a metadata based workflow, creative decisions such as color correction and objective decisions such as clip name and sound sync relationships are applied to source media files on a computer system. Those creative decisions are stored as metadata in an object or set of objects (in a database) that point to the source media. A copy of the source media files are made (known as proxy or child media, described in greater detail below) which inherits as many characteristics of the original as possible for a secondary computer system or platform. For example, child media will retain the exact color characteristics, aspect ratio, length, and resolution, but could be in different file format for ease of transfer to secondary systems or platforms. The metadata objects relating to the child media are stored in the networked master database and are shared with the secondary system or platform or sent via an attending .xml manifest, if transported as physical media.

In various embodiments, the creative and objective decisions that are stored in the metadata are applied to the source media on the first system, and the proxy (or child) media on the secondary system via the metadata objects, called normalized media objects, and universal media objects (described in greater detail below). These are vehicles that contain instructions for rendering on various platforms, and translation and the applications of changes in a shared environment. In this fashion, unaltered source and/or child media can remain unaltered on associate and secondary platforms and any changes made anywhere are shared across the network via metadata objects. This can eliminate the need for the creation of new media to demonstrate creative changes, and keep all project participants current with project progress.

For the purposes of this disclosure, the term "proxy media" should be understood to refer to representative picture and sound media (normally electronic), which are created from original capture media. The process of creating non-tape based proxy media is typically referred to as "transcoding" (the process of converting uncompressed or compressed original electronic capture media (files) to alternate or inferior forms of compressed file-based media to accommodate specific editorial apparatus, and/or other viewing apparatus. Some examples of proxy media include, but are not limited to, Avid DNX, Apple ProRes, MPEG 2 DVD, BluRay, Quicktime.

For the purposes of this disclosure, the term "universal media object" (UMO) should be understood to refer to a virtualized representation of video and audio project data, creative and ancillary project data, and the relationships between them. For example, a UMO might contain virtualized representations of video or photographic elements, audio elements, pointers to proxy elements, color decision lists (CDL) for application to specific image files, sync points between all elements, volume attributes applied to audio files, notes and comments by project administration and creative personnel. For the purposes of this disclosure, the term "virtualized" is used to refer to data objects where such objects are, without limitation, dynamic, alterable, not static. Thus, for example, a virtual clip is not a static element, not baked in any way and its elements are changeable by changing the relationship of elements pointed to by the object In various embodiments, a UMO can also contain unique media identifiers (UMID) defining source or child media connections, and can carry (and work, in conjunction with) normalized media objects (NMO) for efficient interchange to various platforms. For the purposes of this disclosure, the term "child media" is, without limitation, a copy of source media with representative attributes of that source media. Child media can be unadulterated duplicate copies of original source media files, typically in lower file format (smaller file size) for ease of transport and handling. For example, files in a proprietary format can be converted to a more common format, but look identical to that proprietary format. In various embodiments, the UMOs can carry and communicate the complete metadata history of all actions and connections applied to specific source files, series of files, or proxy files, for efficient, calibrated, render function, and to assist a comprehensive archival history.

For the purposes of this disclosure, the term "normalized media object" (NMO) should be understood to refer to a virtualized literal representation of unaltered video, audio, or text based original acquisition files for rendering on various platforms. NMO can also refer to "child NMO" (NMOs created for child media translation to secondary platforms). In addition to all relevant metadata contained in the parent NMO, the child NMO can also contain specific compatibility instructions for specific platform render. For the purposes of this disclosure, the term "literal representation" is intended to refer to, for example, a clip that is a translation of the original media that can be pointed to the original source media or a proxy of that source media, and will behave identically to that original media. In various embodiments, these virtualized entities are the products of a system's core logic application as applied to ingested files for adaptation to specific downstream platforms, in conjunction with UMO metadata instruction.

For the purposes of this disclosure, the term "daily" or "dailies" should be understood to refer to presentation materials that represent a day's motion picture production for the purpose of creative and executive review. These elements can include synchronized video and audio elements (normally in proxy form), that have been subjected to cursory color correction and the insertion of relevant metadata through text inserts in the video display. Proxy media created specifically for applications in various editorial systems, such as Avid, Final Cut Pro, Adobe Premier (as examples), can also be considered dailies materials.

For the purposes of this disclosure, the term "post production" should be understood to refer to all manipulations and processes performed on production acquired media in the course of making (or completing) motion picture content. For example, post production can include picture editing, sound editing, visual effects creation, audio mixing, conform of select final image and sound elements to a specific edit decision list (created by a picture editor). Subsequent final color correction and sound mixing (e.g. dialogue, sound effects, music, etc) are also considered post production processes.

In various embodiments, the systems and methods of the present disclosure provide an efficient motion picture production and post production workflow solution through the use of a single core application logic and master database management system. Such a system can employ unique virtual entities called UMO and NMO (as defined above). These objects can be aided by unique software media adaptors (MA), and media indexers (MI), for efficient platform exchange in a networked configuration of one or more associate systems and secondary platforms to enable a faster means of production media exchange from production locations (set) to the processes of post production and review.

In various embodiments, a metadata-based workflow can efficiently translate media, and the associated creative and objective decisions pertaining to that media, across platforms for the varied processes of post production; thus enhancing workflow efficiencies throughout the process of content creation. For example, this methodology can eliminate the need for linear on-set workflow steps required to prepare media before transfer to various editorial platforms and/or dailies review platforms (e.g. color, sync, alter, transcode, duplicate and physically transport media), and can potentially save as much as a day's time in the course of dailies creation. Various embodiments can provide the ability to immediately translate back to the master database management system all creative and practical changes applied to any file, on any networked "associate" platform (platforms utilizing associate software or system interface for proper communications with the core application logic and archive), through updated UMO, and thus expedite the collaborative and creative process across multiple locations.

In various embodiments, additional workflow enhancements that can be enabled by the presently disclosed system and methods can include, without limitation: (a) enhanced asset tracking, audit, and reporting; (b) a more comprehensive project and process administration; (c) an enhanced means of collaboration with project executives and creative partners in remote locations; (d) the enabling of remote "color look" management and general creative directive; (e) the use of comprehensive manifests for project metadata transport and tracking between non-networked associate systems and platforms (f) a more efficient method of metadata tracking through a master database management system; (g) the management and tracking of pre-production, production, and post production generated ancillary data and metadata (e.g. script supervisor notes, camera and sound reports, 3D stereographer data, pre-visualization files, virtual set data, camera input device transforms, CDL values from a live camera color system, edit decision lists, etc.); (h) a more efficient method and system for interface with various and advancing acquisition and post production technologies.

FIG. 1 is a block diagram depicting an embodiment of the relationship of machine, user, and project configurations to a database management system. Using system software, the system operator can define multiple levels of system configuration (2, 3, and 4) at multiple points within the processes of project set-up and workflow definition as described below. In an embodiment, machine preferences (1) can be defined by the hardware configuration in each system, both local and remote. In an embodiment, upon interface to the database management system (6), the core application logic (5) can automatically adapt to specific system configurations. Combined, these configuration settings define individual project requirements that govern (but are not limited to) project workflow, media exchange and metadata tracking, asset management, and comprehensive project reporting, as examples.

Figure 2:
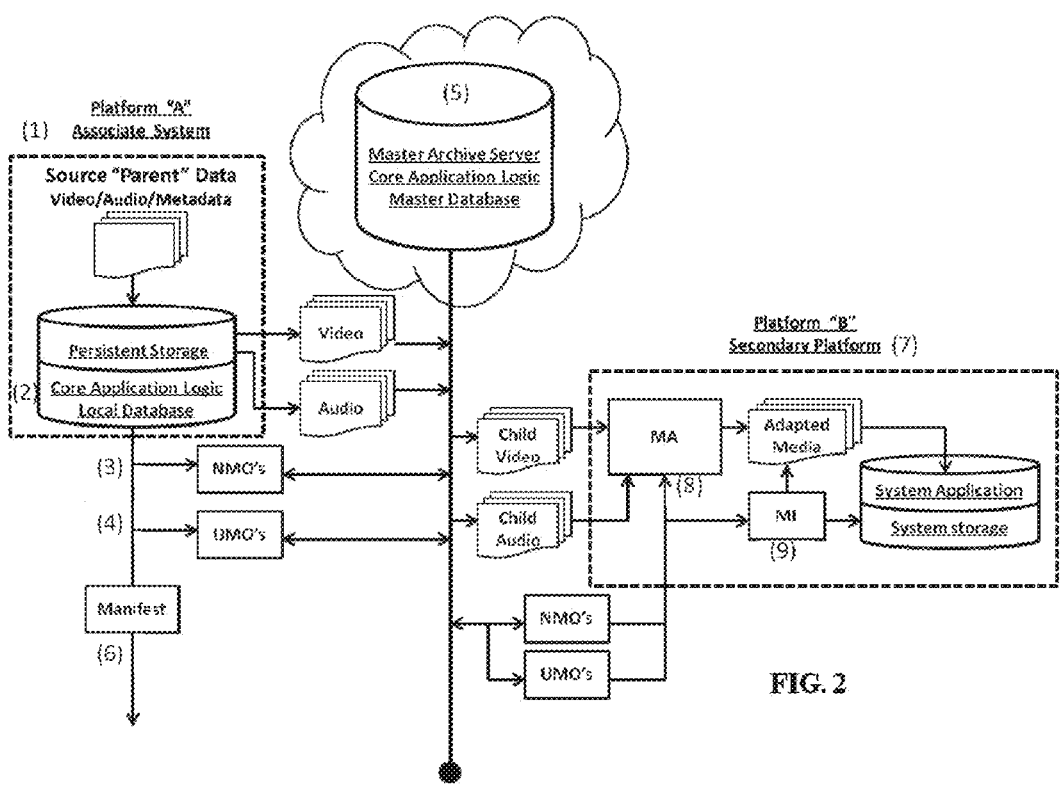
FIG. 2 is a diagram depicting of an embodiment the application of metadata objects for expedited transfer to alternate post production platforms, in accordance with the present disclosures.

FIG. 2 is a diagram depicting an embodiment of the application of metadata objects created by a system's core application logic for expedited transfer of acquisition source media to various platforms.

In an embodiment, original source media is ingested into platform system A (1). Upon ingest, the core application logic (2) can create normalized media objects (NMO) (3). These objects are virtualized representations of the unaltered source media files, and can also be endowed by the application logic with a number of system preferences and compatibility instructions for a variety of platforms to enable efficient platform interchange of unaltered "child source files". The application logic can also create UMOs (4). In an embodiment, the UMOs can contain one or more NMOs and the relationships between them as well as other relevant metadata. For example, color decisions, audio and video sync points, in-and-out points, 3D (stereoscopic) spatial relationships, watermarkings, etc. Platform A can then transfer original acquisition files and/or child files for storage in the master archive, via network, along with related NMOs and UMOs. Should the master database not be networked to an associate system, the associate system can issue a manifest (.xml file) (6) to accompany any original source or child files to another associate system or platform. In an embodiment, metadata objects contained in the manifest can include, but not be limited to: naming of master clips, camera set-up information (e.g. lens type, GPS coordinates, etc.), all applied color decisions, sync picture and sound relationships, project definitions, checksums, project and workflow preferences, transcode preferences for proxy media creation (digital-to-digital data conversion of one encoding to another), executive and creative comment, as examples.

Platform B (7) represents a secondary platform employing an associate software interface program, or plug-in, herein referred to as a media adaptor (MA) (8). As an interface device, the MA can access the master database and system server remotely, via secure network, to access unaltered child source media and the associated child NMO, UMO objects. Aided by a media indexer (MI) (9), the MA can draw compatibility instructions contained in the NMO and supporting metadata contained in the UMO and individual file headers, for application to the unaltered source and/or child files for proper calibration and rendering. The MA can then output adapted media, calibrated specifically to the secondary platform.

For the purposes of this disclosure, the term "media adaptor" should be understood to refer to an interface (e.g implemented via software, firmware or equivalent circuitry) and conversion point for the application of creative and objective decisions to unaltered child source media importing to, and residing in, secondary platforms that are unable to directly utilize the child source media. For the purposes of this disclosure, the media indexer refers to a component (e.g. implemented via software, firmware or equivalent circuitry) that resides on a given platform, and seeks to understand and pre-allocate metadata from NMO, UMO, and individual file headers and/or groups of files. This metadata can include, but not be limited to, specific project instructions (e.g. audio and video formats, resolutions, bit rate, sample rate, etc.), versioning, checksums, system and platform information, and any changes applied to files while on the platform. In an embodiment, these changes can then be communicated back to the master database via updated UMO for project history and awareness.

The disclosed systems and methods can thus provide ability to immediately transfer original acquisition files (unaltered duplicate source and/or child media) from a production location (set) to various platforms, in equal or lower file formats (e.g. smaller file sizes), for immediate ingest and processing. The disclosed systems and methods bypass linear on-set workflow steps (e.g. color, sync, alter, store, transcode, duplicate, and physical transport) required to prepare media for transfer to various post production platforms and/or dailies review platforms, and can save time in the course of dailies creation. In an embodiment, all actions, decisions, adjustments, or notes performed on platform B can be automatically logged at the moment changes occur, ensuring the master database is continually updated and that all subsequent platform renders represent current project progress. Consequently, this method and system can not only save time to post production, but also enable more efficient creative collaboration, over a number of remote locations, throughout the course of a project.

Figure 3:
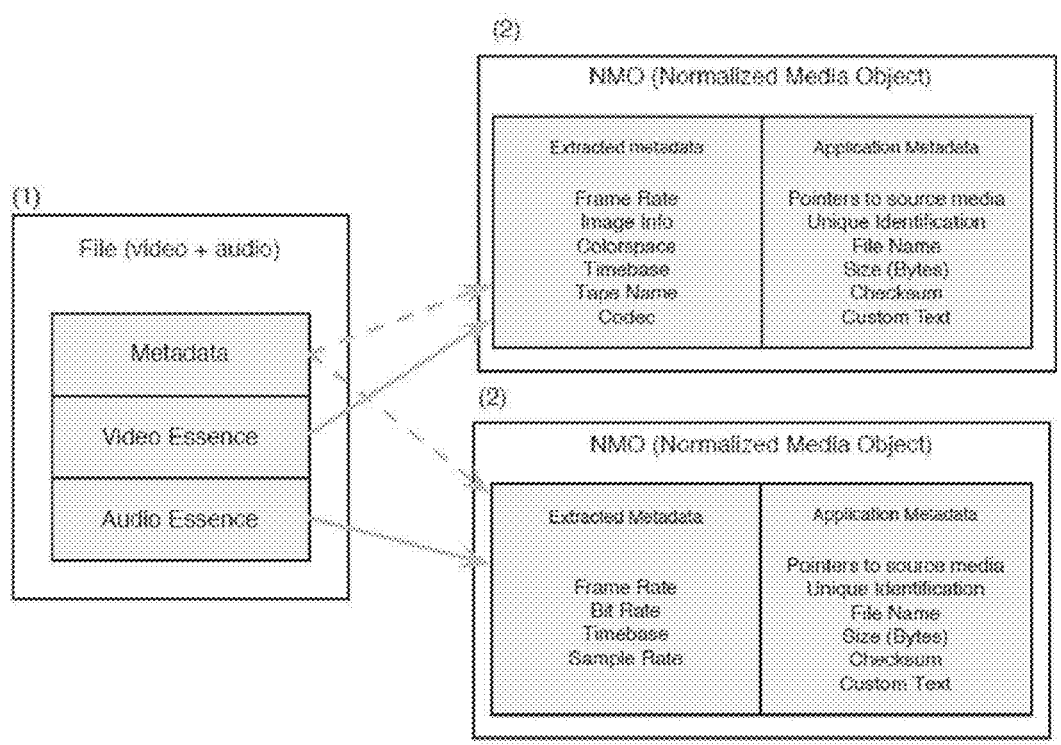
FIG. 3 is a diagram depicting an embodiment of the creation of a normalized media objects in accordance with implementations of the present disclosures.

FIG. 3 Is an illustration of the creation of specialized metadata objects called normalized media object (NMO) by the system's core application logic. Upon ingest into the system, the core application logic identifies the source media files (1) and media essence metadata (e.g. resolution, codec, frame rate, duration, etc.) is extracted and media essence (physical location of the media in memory, a file system, or data tape, as examples) are referenced. These extractions are then communicated to the new metadata objects. Objects are created for each media element (2). Additional metadata is communicated to the newly created object by core logic. This metadata can include, but not be limited to, file size, file name, UMID, checksums, and more, as examples. Once created the NMO can be inserted into the database for future access.

Figure 4:
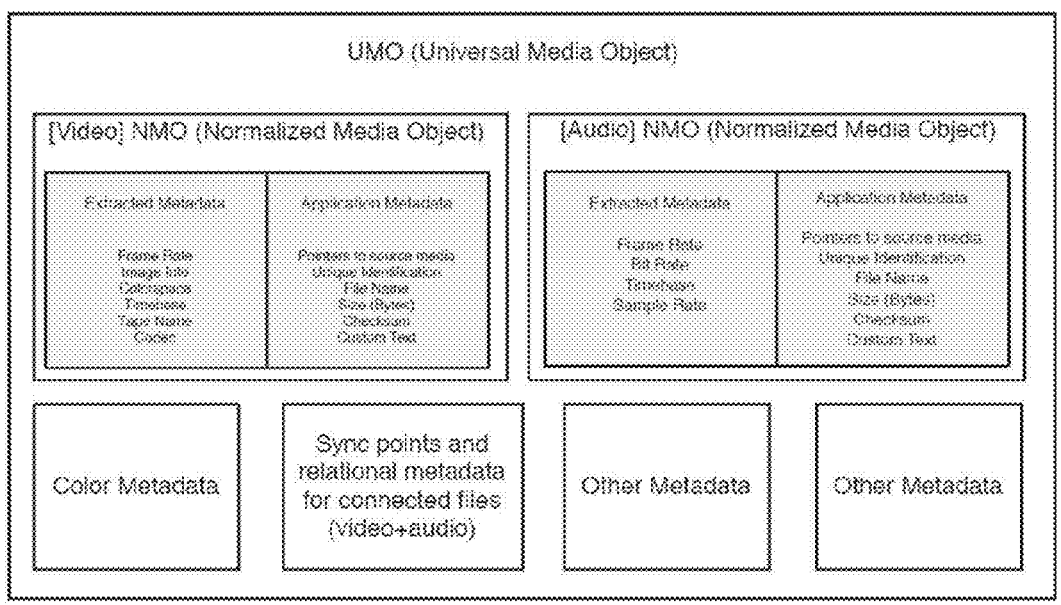
FIG. 4 is a diagram depicting an embodiment of the creation of universal media objects in accordance with implementations of the present disclosures.

FIG. 4 is an illustration of the creation of a specialized metadata object called a universal media object (UMO) by the system's core application logic. The UMO can contain one or more NMO/s and the relationships between them, as well as other relevant metadata (e.g. color decisions, audio and video sync points, in and out points, 3D spatial relationships, watermarkings, etc). The sync relationships between NMO objects can all be referenced to a specific time line which is unique to the source media identified by the NMOs and UMO. Should child source files be created for transfer to secondary platforms, "child NMOs" (reformatted NMOs containing specific platform compatibility instruction) can also be contained within or referenced by the UMO. Once created the UMO can be inserted into the database for future access and update.

Figure 5:
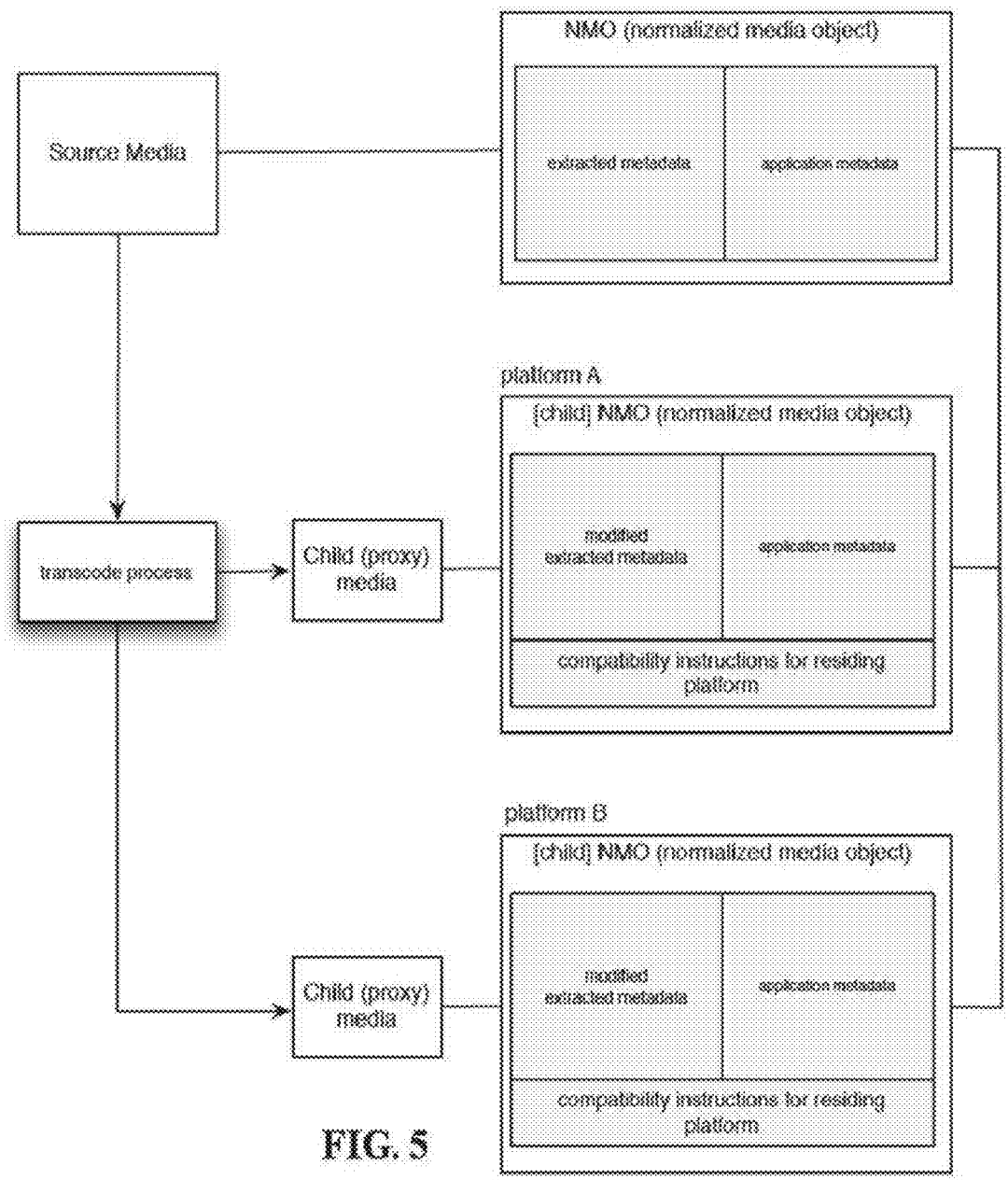
FIG. 5 is a diagram depicting an embodiment of the creation of child media and child metadata objects in accordance with implementations of the present disclosures.

FIG. 5 is an illustration of the creation of child media files and child NMO objects for two target platforms. Upon child media creation a child NMO is created that contains platform specific compatibility instructions and which references the newly created child media files. Child NMOs can also be inserted to the master database for access by the target platforms and updated to appropriate UMOs. Upon interface to the master database and archive, platforms A and B can access the appropriate child media and child NMOs via the resident MA. When received by a secondary platform, the MA can access compatibility instructions from the NMO and all other relevant metadata required from proper render from the UMO.

Figure 6:
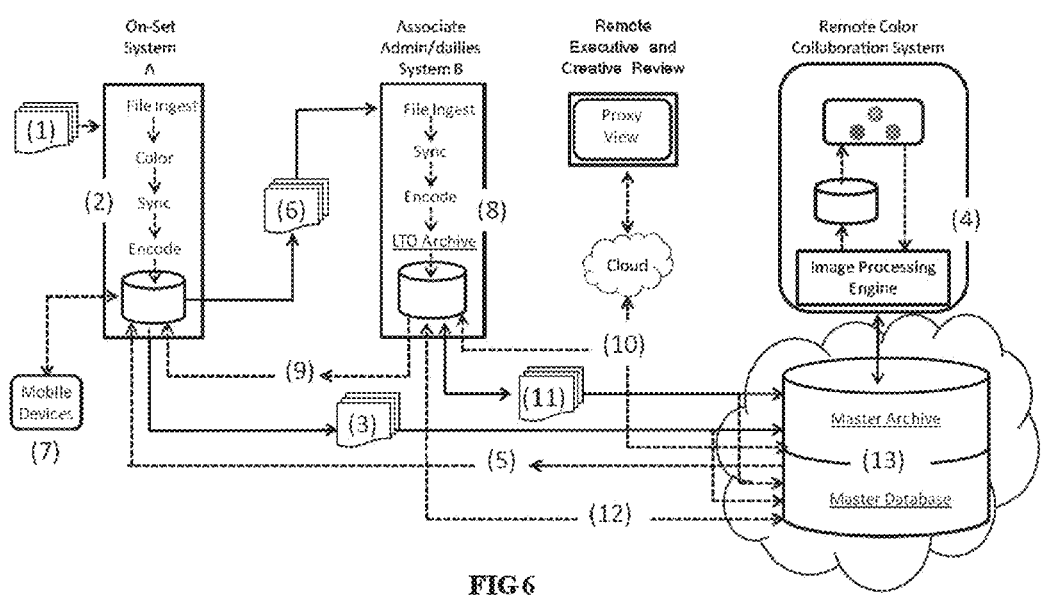
FIG. 6 is a diagram depicting of an embodiment of associate networked systems collaborating through a master database management system and archive, in accordance with implementations of the present disclosure.

FIG. 6 is a diagram depicting one embodiment of a scheme, in accordance with implementations of the present disclosure, for networked operations between associate systems of like platform for project collaboration and support. Serving as the project hub for all remote and local associate systems, the master database management system (13) can communicate predefined project preferences and workflow "profiles" (proxy media configuration preferences) automatically to remote system databases upon network log-in. In an embodiment, all project and file activities relating to source media can then be logged back to the master database for a comprehensive project record (e.g. UMO updates, user log-ins, file manipulations, file duplications, file distributions, new project preferences and/or new workflow profiles, as examples). Checksumed copies (clones) of all original acquisition media can also be transferred to the master archive (13) via secure network (VPN or AES encrypted) (3, 11), or by physical shuttle device. In an embodiment, where networked operations are not possible, project and file history can be communicated to the master database and/or associate systems via a project manifest (.xml file), which can accompany the duplicate source media files. The manifest can also contain all relevant metadata objects for efficient file exchange and render on various platforms.

As illustrated, a remote associate system (2) can ingest original acquisition elements (1) from multiple sources, and can store them to on-board persistent storage. System software can then manage the data according to preset workflow preferences identified by the master database management system (13), or local operator. In an embodiment, should the workflow require remote collaborative input (e.g. color decisions) the operator can export representative frames or sequences of frames (clips) via secure VPN or AES encrypted network (3) to the master archive for access by secondary platforms. These files can be original source media files or an unaltered child media, accompanied by NMO and UMO objects.

In an embodiment, when image files are received and appropriately rendered at the remote system platform, the files can be augmented (4) and all color decisions (e.g. LUT and CDL values) can be communicated back to the master database by updated UMO. The updated database can then update the remote associate (on-set) system A (2) in like fashion. System A can also distribute child media to on-set mobile display device platforms, via WiFi, or other transmission means (7). If dailies or distribution deliverables are not to be created in an on-set environment, duplicate acquisition files can be forwarded to admin system B (8) via secure network, or physical transfer via portable record device (6). If acquisition files were previously forwarded to the master archive (3) by system A, then system B can access them directly (11) through the networked master archive, along with all relevant metadata objects resident in the master database. If files were received via portable record device they can be ingested to system B's persistent storage and system B's operator can, if necessary, initiate editorial, dailies, and distribution proxy media creation in accordance with the project and workflow preferences provided by the master database.

In an embodiment, at any point after file ingest, system B's operator can archive all acquisition files not received from the master archive, to the master archive and/or mirrored LTO tapes. When files are confirmed to archive, the master database management system and/or admin system B can issue one or more reports notifying project admin (9), and the system A operator (2). Proxy files, accompanied by NMO and UMO information can also be exported for executive and creative review platforms, via a secure network (10) from either admin system B, or the master database management system and archive. Executive comment, dailies approvals, and authorizations for on-set media purge and recycle (1) can in turn be communicated back to the master database, and thus associate admin system B, and system A, by updated UMO, via network (10), and a record of all transactions and authorizations can be maintained by the master database (13) for project reporting.

In an embodiment, throughout this process, the master database and archive can also administer access and distribute to various post production platforms, simultaneously, as production source and/or child media enters the archive. These transactions too can be recorded in the master database for project reporting, element tracking, and asset management.

Figure 7:
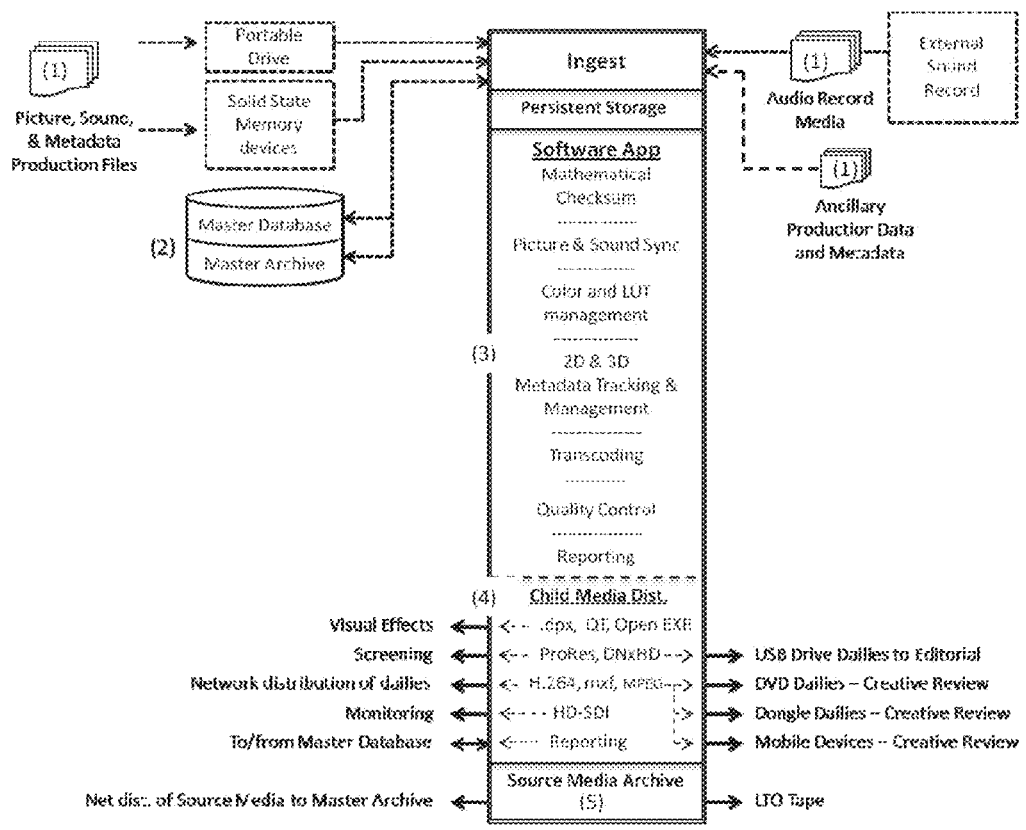
FIG. 7 is a diagram of an embodiment of a data management system in accordance with implementations of the present disclosure.

FIG. 7 is a diagram illustrating the system's core application function as applied to ingest and management of compressed and uncompressed production acquisition assets (picture, sound, metadata, ancillary data), from a variety of record media and/or devices in an on-set, near-set, or post production scenario. In various embodiments, functions can include, without limitation: ingest of various acquisition data files and recordation to persistent storage, with checksum and the creation of NMO and UMO metadata objects for newly ingested files; (1); acquisition of project media and predefined project and workflow preferences (a sequence of connected functions as recorded by the master database) (2); initiation of new project and workflow preferences (if not provided by master database) which can include stereoscopic (3D) preferences, image and sound synchronization, color manipulations, transcoding of select files according to defined workflow preferences, project and asset monitoring, metadata-based report generation, and more (3); preparation and distribution of export files for dailies, visual effects, editorial, metadata updates to the master database, and more (4); archiving to the master archive and LTO, or other archival media (5); as examples.

In an embodiment, upon networked connection to the master database, the master database management system can update the local system software and database with predetermined project and workflow preferences for a specific project. In an embodiment, the system operator can augment project and workflow preferences, or create entirely new project preferences, should no predetermined project preferences be resident in the master database. As preferences are logged in the networked local database, the master database can be updated.

In various embodiments, preferences can include (but not be limited to): Automated transfer destinations for source and child media; identification of proxy media required for editorial and dailies; transcode profile preferences; audio channel selections; audio mapping (assignment of select audio channels to proxy media creation); file trim settings (select files within a series of files or clip); proxy media image crop settings (displayed aspect ratio); metadata selections for proxy media burn-in (superimposition over picture); and more. If a 3D project, additional parameters and functions can be required such as (but not limited to), auto clip grouping, which can include the identification of either left or right eye orientation for flip and flop, and can include auto tagging of a specified eye as the "hero eye". Where specific metadata is not available to enable auto clip grouping, manual clip grouping can be accomplished by the system operator upon ingest of stereo files.

In an embodiment, as acquisition files are ingested into a remote system, the files can be directed to RAID protected storage, and/or other specified storage devices. If files are received from the master archive or other remote associate system, the system can apply a master checksum contained within the accompanying UMOs to the ingested files to ensure accurate reproduction to RAID storage. In an embodiment, should ingested files come from a non-networked associate system, a project manifest (attached to the source files) can contain associated UMOs for master checksum reference. In an embodiment, should files arrive independent of any associate system the system can apply a new checksum that can be logged as the master checksum for the ingested files. The new checksum can then be communicated to the master database via UMOs, and recorded in a project manifest for future reference. Checksums can be MD5, Sha1, Sha2, Sha256, or similar, as examples, and applied to all media ingested into the system (e.g. picture, sound, and metadata).

In an embodiment, if the ingested files have not been previously managed by an associate system, the system's auto-sync function can identify, upon ingest, related picture and sound files by time-of-day time-code and rename the picture file to coincide with the related audio file ID contained in the broadcast WAV audio file metadata. In various embodiments, manual adjustments to auto-synced files can be made by utilizing the system's manual sync functions, on a frame or sub-frame level, to compensate for possible time-code disparity between picture and related sound elements. The system can also employ clap detection (audio waveform spike detection), slate detections (metadata from a smart slate), and or scratch track matching (comparison of separate audio track to an audio scratch track resident in the video file) to determine audio to video sync relationships.

In an embodiment, color adjustments can be applied using the system's color adjustment tools, producing color decision list (CDL) values which can be represented in metadata. Color look-up tables (LUT) can also be applied to change color space (for example, from a log, non-linear, color space to a linear color space such as SMPTE rec. 709). These LUTs can also be logged as metadata in the UMO. In an embodiment, if files are received from the master archive or an associate on-set system, LUT and CDL decisions can have already been applied. In this case, the master database UMOs can contain all color decision history for application in transcode function, local monitoring, and NMOs can provide render instruction for calibration to variant platforms. Any additional color decisions accomplished in the system after ingest can also be updated to the master database by UMO for application to dailies and editorial proxy media generation, monitoring, and other down-stream processes and applications on various platforms employing associate interface software and/or plug-in In an embodiment, when creating proxy media for physical delivery, all color and preselected workflow preferences can be applied (burned-in) to the proxy media during the transcoding process leaving the original files unaltered. In an embodiment, each transcode transaction can be completed using verified (checksumed) original camera or duplicate files to ensure that the transcoded proxy is an accurate representation of the original file with its associated metadata. In an embodiment, transcoding of files can occur in the background, concurrent with other system operations, such as ingest of new files to persistent storage, color applications, and system auto and manual sync, for example. Common formats for conversion within the system can include (but are not limited to) DNxHD36, or DNxHD 115, or DNxHD 145, or DNxHD 220, or ProRes Proxy, or ProRes LT, or ProRes 422, or ProRes 422HQ, or ProRes 4444, or MPEG 4 h.264, or MPEG IMX, or MPEG 2 DVD, or Windows Media files, or QuickTime, as examples. Transcoded files can be exported for editorial and dailies distribution by various means (e.g. encrypted file transmission via network, DVD or BluRay, USB or Firewire drive, or other portable record device). Proxy files can also be streamed locally to authorized mobile devices via WiFi, or to remote viewing, via secure network for creative review. Original uncompressed files can be exported in their native format or output as uncompressed QuickTime, .dpx, open EXR, or other formats. Original compressed files can also be exported as uncompressed files, in uncompressed QuickTime, .dpx, open EXR, or other formats.

In an embodiment, at any time in the process, original acquisition source files stored in persistent storage can be archived to the master archive via network or portable drives, and mirrored LTO tapes or other archival media. During the process of archiving, the system can apply the appropriate master checksums to the duplicate files to ensure that all archived files are exact duplicates of the originally stored acquisition files. When archiving is verified complete, the local system's software can publish, via network, a file status report to project admin, the master database, and all networked associate project systems.

Finally, in an embodiment, the system software can provide a dynamically created report containing project summary information (e.g. number of video files, video clip durations, total data volume in gigabytes, etc.). Also included can be a list of project details identified by shoot day, including camera files by clip name, episode or project name, duration, associated sound roll, circle-take, original camera file name, comments, and more. An LTO archive summary can also be generated that identifies archival tape name, barcode, LTO type, TAR information (e.g. block size, blocks used, size, etc.), and/or other LTO information. These reports can be distributed directly to project administration via PDF, or other file format, or exported to the master database management system, which can generate and distribute duplicate summary reports to project administration, via network.

Figure 8:
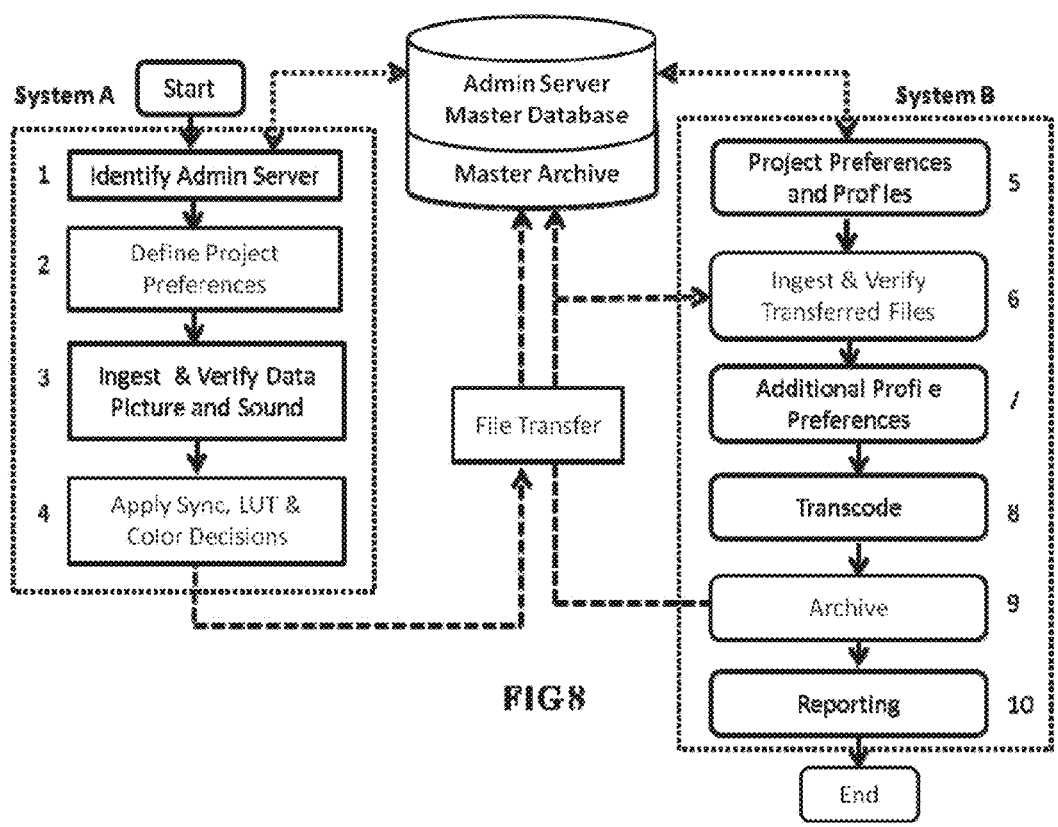
FIG. 8 is a flowchart illustrating of an embodiment of collaborative workflow steps in accordance with implementations of the present disclosure.

FIG. 8 is a workflow chart illustrating an embodiment of a workflow scenario in context with the present disclosures, and can include, but not be limited to, the following procedures.

(1) In an embodiment, the on-set system A operator, using a system software application graphical user interface, can log onto secure network and identify the master database management system, and other associate systems (system B) working in tandem on a project. In an embodiment, once networked, the remote system can access the system's core logic and master database for project administration, while also communicating with other networked systems for file sharing and reporting via a virtual private network (VPN), or other secure network scheme. This method can enable a more efficient means of file exchange, project management, and reporting, and can provide a higher level of file security by enabling the master database to monitor and report all log-ins, file duplications, transcodes, transfers, or other file applications performed on any system. In an embodiment, should activities be performed while systems are off network, the master database can be updated of all non-networked file activity by the remote system's database upon resumption of network communications.

(2) In an embodiment, should project preferences not be resident in the master database, the system operator can initiate a new project, using various local system graphical user interfaces. As project preferences and workflow profile preferences are defined, the networked master database, and thus other networked systems, can be automatically updated with the new project information.

(3) In an embodiment, acquisition files (picture, sound, metadata, ancillary production data, etc.) can be received from various record media devices (e.g. solid-state record media, USB drive, Firewire drive, etc.). Using the system ingest graphical user interface, the system operator can bring media files into the system as either 2D or 3D master files (audio/video or ancillary production data). At ingest, each source file delivery device can also be named and identified to the system. These record devices can then be recognized each time they interface to the system, and the ingested files can be directed to persistent storage. In an embodiment, as files are ingested a mathematical checksum can be applied to perform a byte for byte comparison of all original acquisition files to the duplicated files stored in persistent storage. The system can then log the ingest checksums to the appropriate file UMOs and the master database can be updated with the master checksum. These checksums can then be considered the "master checksums" and can be applied to all downstream duplication and ingest of the corresponding files.

In an embodiment, following initial ingest, the system operator can choose to apply the master checksums a second time to newly ingested files for further verification of successful duplication to persistent storage. The operator can also, at any time, monitor file status and specific function progress by switching to the appropriate system's software graphical user interface. Using the graphical user interface, the operator can track ingest progress by fill bars and see visible confirmation that the newly ingested files were accurately duplicated to persistent storage. This confirmation can be demonstrated by the display of a green (dot) marker. Should a disparate file be detected during the checksum process, the disparate file can be clearly identified with a red (dot) marker, notifying the system operator that an error occurred in duplication.

(4) In an embodiment, during ingest, the system application can automatically compare picture and sound file metadata information, looking for a time-code match. Once a match is found, the system's auto-sync function can synchronize corresponding picture and sound files. As part of the auto-sync function, the picture file can also be automatically renamed to coincide with the sound file ID contained in the broadcast WAV audio file metadata to facilitate efficient file organization and identification in the editorial process. The system can then log the picture and sound file as related, notifying the system operator through another software graphical user interface that sync has been identified. In an embodiment, the system operator can then visually confirm auto-sync and can make audio sync adjustments (frame or sub-frame increments), using graphical user interface tools to compensate for any time-code discrepancy that might exist between the two files (picture and sound). In an embodiment, the operator can also identify (tag) circle-takes (select takes) for use in editorial on the graphical user interface screen. Each circle-take identified (picture and sound file) can also be identified to the database for project reporting.

In an embodiment, the system operator can also switch to a color mode graphical user interface for access to an array of color adjustment tools, and the option of selecting a number of predefined look presets (predetermined CDL values) and LUTs that can have been previously loaded into the database. LUT applications can be applied to picture monitoring and further color adjustments can be applied to the file while being viewed in the LUT defined color space. These color adjustments are typically (but not limited to) lift, gamma, gain, and saturation. In an embodiment, the system operator can also export representative frames, or sequences of frames via secure network to a remote system or platform for collaborative color decisions. These CDL values can then be communicated back to the master database and remote system via updated UMO, as previously described. In an embodiment, the local system software can then log all LUTs and CDL information received for application in proxy media generation.

In an embodiment, at any time in the process, system A's operator can copy any or all acquisition source files, or child files, to the master archive and/or an associate system, via network or shuttle device (USB or Firewire drive, or other transport means). Upon arrival in the master archive, original production acquisition files (picture sound and metadata) can be immediately available to all other post production processes.

(5) In an embodiment, where a networked associate or admin system (B) is included in the workflow, the associate system can be prepared by the master database management system to receive and manage data according to project and workflow preferences previously defined and reported to the master database. In an embodiment, additional project and workflow preferences can be contributed to the master database by the system B operator, as well. Examples can include, but are not limited to: identification of proxy media and transcode formats for required editorial and dailies media; automated transfer destinations for received media and transcoded files; audio channel selections; audio channel mapping; file trim settings; proxy media image crop settings; metadata selections for proxy media burn-in; and more.

(6) In this scenario, system B can receive original acquisition files from system A or the master archive, via secure network, or via portable shuttle device. Acquisition source files can be ingested to the system using system B's ingest graphical user interface. During ingest, the transferred files can be directed to persistent storage and the master checksums provided in the accompanying UMO can be applied (or manifest, if received by shuttle device from an associate system) to ensure accurate duplication of the master files to storage. If received files are direct from acquisition record (such as second unit production, etc.), system B will assign new checksums to the ingested media and the checksums recorded to the database. During ingest, the operator can monitor ingest progress on multiple system software graphical user interfaces and verify successful duplication to storage and file status by viewing a visible confirmation (green dot marker) indicating that the ingested files were accurately duplicated to persistent storage. Should an ingest error occur, a red dot marker beside any listed file can indicate a duplication error. When ingesting files that had been previously ingested by an associate system, all related picture and sound files can have been previously identified by time-code (and other relationships) and paired accordingly. At any time after ingest, any new files received by system B can be transferred to the master archive for immediate availability to networked post production processes.

(7) In an embodiment, should additional creative decisions (color, crop, sizing preferences) be made at system B, or should new workflow and/or profile preferences be required, these can be added using the appropriate system software graphical user interfaces. For example, if color changes are to be made, they can be made by accessing the system software's various color tools contained in the software graphical user interface. If all or select files are to receive new aspect ratio assignments or composition adjustments, the system operator can use the appropriate software graphical user interface for aspect ratio (crop) adjustment to augment existing workflow preference, or create a new crop preference by selecting a standard aspect ratio option, or by creating a custom crop. In an embodiment, should additional metadata burn-in requirements for proxy media arise, the system operator can choose additional metadata options, or create unique information for burn-in, such as "property of," etc. When complete, the system operator can assign the new profile preferences to an existing predefined workflow, or create a new workflow/s for the new preferences. During this process, the system can automatically update the master database of all new workflow and profile preferences as they are entered into system B's networked database, thus updating all project associate systems.

In this scenario, media transcoding takes place in system B, rather than system A, or a networked MA. In an embodiment, system B's operator can select additional transcode preferences to amend the transcode profiles previously communicated by the master database for physical media delivery, or create an entirely new profile using the appropriate system software graphical user interfaces. Using the transcode preference graphical user interface the system operator can identify new transcode preferences or amend existing transcode profiles. In an embodiment, once preferences have been defined, the system operator can assign the new transcode preferences to a specific workflow for proxy media creation, or create an entirely new workflow specifically for the new transcode requirement.

(8) In an embodiment, at any time in the course of a project, the system operator can identify files for a transcode queue. Once assigned to the queue, the system can automatically execute all workflow preferences for transcoded media according to the predefined workflow preferences stored in the local and master database. In various embodiments, preferences can include but not be limited to: output file format, audio channel assignments, LUT and CDL applications, crop preferences, metadata burn-in preferences, Avid Log Exchange (ALE) information, and more. In an embodiment, transcoding of files can occur in the background, concurrent with other system operations, such as ingest of new files, or sync and color operations, as examples. Transcoded files can also be automatically saved to persistent storage, and other predefined secondary record destinations, per project preferences; and the system can notify the master database of the media creation for project history and audit.

In an embodiment, transcoded proxy media intended for physical delivery can then be exported via secure network or shuttle device (i.e. USB, FireWire, or other drive, DVD, Blu-Ray, or other distribution media) for post production, dailies, and remote executive and creative review. This process can be either automated as files arrive in the queue, or directed by the system operator manually.

(9) In an embodiment, original acquisition files (camera, sound, metadata, and ancillary production data) recorded to persistent storage can be backed up to the master archive, and/or mirrored LTO tapes, or other archival record media type. In an embodiment, this can be initiated by the system operator at any time in the process, using the appropriate system software graphical user interface. When transfer is initiated by the system operator, the system can apply the master checksums to the duplicate files stored to the archive or LTO tape to ensure accurate reproduction to archive. Progress of transmission and LTO recording can be monitored by the operator on the system's graphical user interface. A green dot marker can indicate successful completion of transfer/record. Should an error occur during archiving, a red dot marker can identify a corrupted file. When transfer is complete, a file status report can be distributed by the master database, or the sending system, to project admin, and other associate project systems (i.e. system A), via network.

(10) In an embodiment, a comprehensive report can be automatically generated by the master database management system or any networked associate system. In various embodiments, reports can include (but not be limited to) dynamic summary information such as project name, number of video files, video clip durations, and total data volume of clips. The report can also identify circle-takes, NG clips, sound roll numbers, file names, and operator comments, etc. Additionally, an archival LTO summary can be included which can include (but not be limited to) archival tape name, barcode information, LTO media type, and TAR information (i.e. block size, blocks used, TAR block file assignments, size, etc.). In an embodiment, the report can be exported via network as PDF, or other file format, or distributed via solid-state media.

Figure 9:
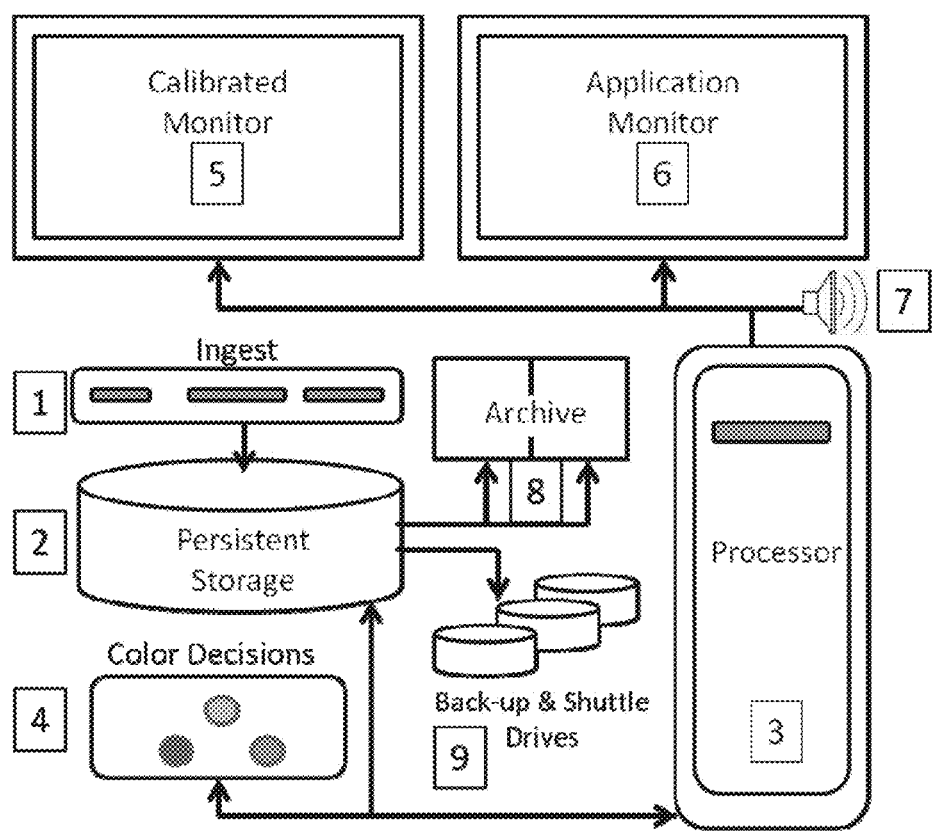
FIG. 9 is a representative diagram of an embodiment of a mobile (or remote) system hardware configuration in accordance with an implementation of the present disclosure.

In various embodiments, by way of example, and not limitation, FIG. 9 can represent a simple system hardware architecture that can apply to a remote system such as those described in FIGS. 6 and 7. It should be noted that systems can be configured differently as hardware requirement for specific projects and venues vary. For example, the ingest station (1) can be an asynchronous QIO (Queue In/Out) interface comprised of various card readers; typically CF, SxS, SSD, P2, and others. Files can also be ingested through independent portable record devices, or a network via USB, ESATA, Ethernet, or other interface option. Ingested files can be directed to persistent storage (2), which is comprised of enterprise class RAID protected storage. Persistent storage can be accessed and manipulated by the systems core logic application software contained within the multi-core processor (3). Color decisions can be made from a color control panel (4), and displayed on a professional grade SMPTE rec 709 calibrated monitor (5). The program application and menus can be viewed on an un-calibrated LCD (or similar) monitor (6). Audio monitoring can be either stereo or mono for the purposes of confirming audio to picture synchronization (7). Archival storage can be enabled by network transfer to the master archive or by record to two LTO magnetic tape recorders (8). Back-up and shuttle drives (9) can be various and non-specific; Firewire drives, USB drives, solid state record media, and other record media and devices, as examples.

Various implementations of the systems and techniques described here can be realized in digital electronic circuitry, integrated circuitry, specially designed ASICs (application-specific integrated circuits), computer hardware, firmware, software, and/or combinations thereof. These various implementations can include one or more computer programs that are executable and/or interpretable on a programmable system including at least one programmable processor, which can be special or general-purpose, coupled to receive data and instructions from, and to transmit data and instructions to, a storage system, at least one input device, and at least one output device. Such computer programs (also known as programs, software, software applications or code) can include machine instructions for a programmable processor, and can be implemented in any form of programming language, including high-level procedural and/or object-oriented programming languages, and/or in assembly/machine languages. A computer program can be deployed in any form, including as a standalone program, or as a module, component, subroutine, or other unit suitable for use in a computing environment. A computer program can be deployed to be executed or interpreted on one computer or on multiple computers at one site, or distributed across multiple sites and interconnected by a communication network.

A computer program can, in an embodiment, be stored on a computer-readable storage medium. A computer-readable storage medium stores computer data, which data can include computer program code that is executed and/or interpreted by a computer system or processor. By way of example, and not limitation, a computer-readable medium can comprise computer readable storage media, for tangible or fixed storage of data, or communication media for transient interpretation of code-containing signals. Computer readable storage media, can refer to physical or tangible storage (as opposed to signals) and can include without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Figure 10:
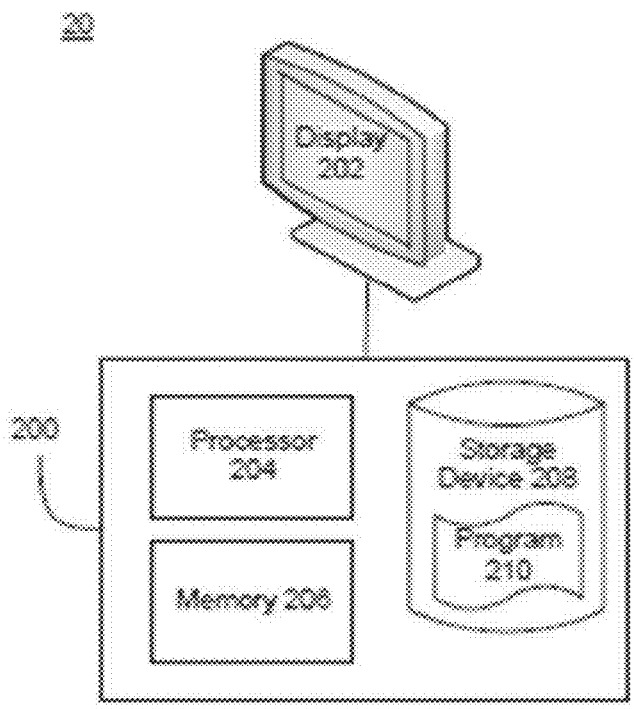
FIG. 10 is a block diagram of an embodiment of a computing architecture.

FIG. 10 shows a block diagram of a generic processing architecture, which can execute software applications and processes. Computer processing device 200 can be coupled to display 202 for graphical output. Processor 204 can be a computer processor capable of executing software. Typical examples of processor 204 are general-purpose computer processors (such as Intel® or AMD® processors), ASICs, microprocessors, any other type of processor, or the like. Processor 204 can be coupled to memory 206, which can be a volatile memory (e.g. RAM) storage medium for storing instructions and/or data while processor 204 executes. Processor 204 can also be coupled to storage device 208, which can be a non-volatile storage medium such as a hard drive, FLASH drive, tape drive, DVDROM, or similar device. Program 210 can be a computer program containing instructions and/or data, and can be stored on storage device 208 and/or in memory 206, for example. In a typical scenario, processor 204 can load some or all of the instructions and/or data of program 210 into memory 206 for execution.

Program 210 can be a computer program capable of performing the processes and functions described above. Program 210 can include various instructions and subroutines, which, when loaded into memory 206 and executed by processor 204 cause processor 204 to perform various operations, some or all of which can effectuate the methods, processes, and/or functions associated with the presently disclosed embodiments.

Although not shown, computer processing device 200 can include various forms of input and output. The I/O can include network adapters, USB adapters, Bluetooth radios, mice, keyboards, touchpads, displays, touch screens, LEDs, vibration devices, speakers, microphones, sensors, or any other input or output device for use with computer processing device 200.

Figure 11:
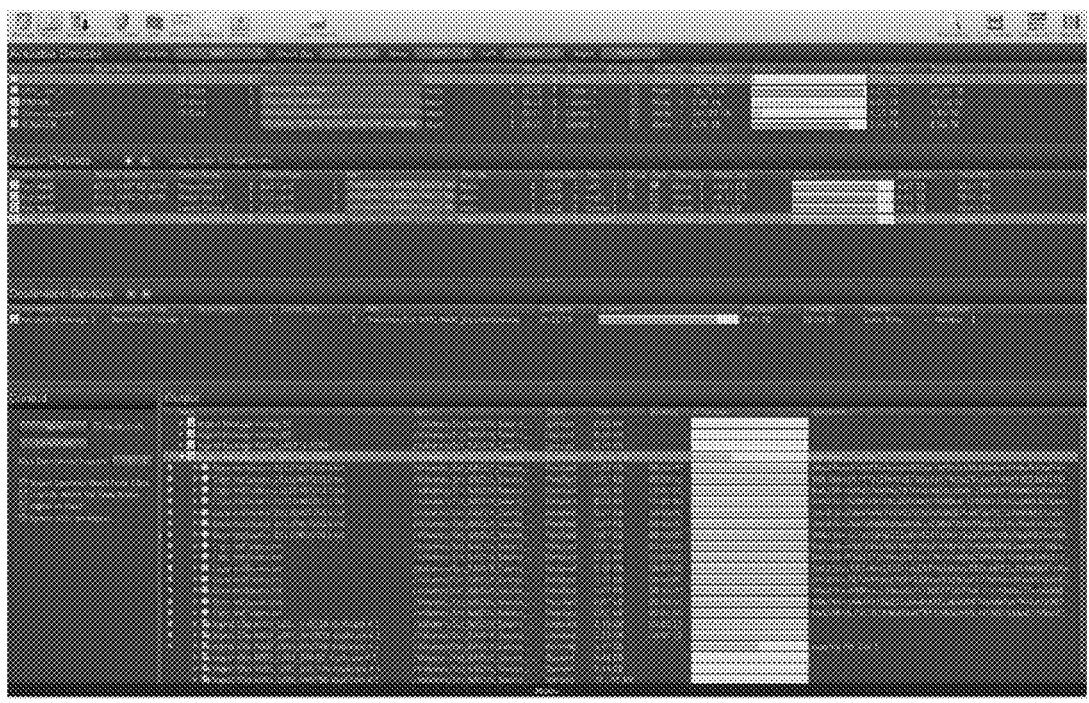
FIG. 11 is an embodiment of an illustrative graphical user interface for file ingest in accordance with the present disclosures.

FIG. 11 shows an embodiment of an illustrative graphical user interface depicting (but not limited to) ingest of image, sound, metadata, and ancillary production data to a systems RAID storage and database, in accordance with the present disclosures. Using the ingest graphical user interface: source devices can be identified, selected, and named; media can be organized by episode and shoot day; media data volumes can be monitored; RAID capacity can be monitored; record paths to specific destination record devices (other than default RAID persistent storage) can be identified; ingest progress can be monitored by fill bar and a "dots" view (e.g. Blue=transfer in progress, Green=successful duplication, Red=duplication error, Orange=aborted ingest); and applied checksums can be displayed and confirmed, as examples.

Figure 12:
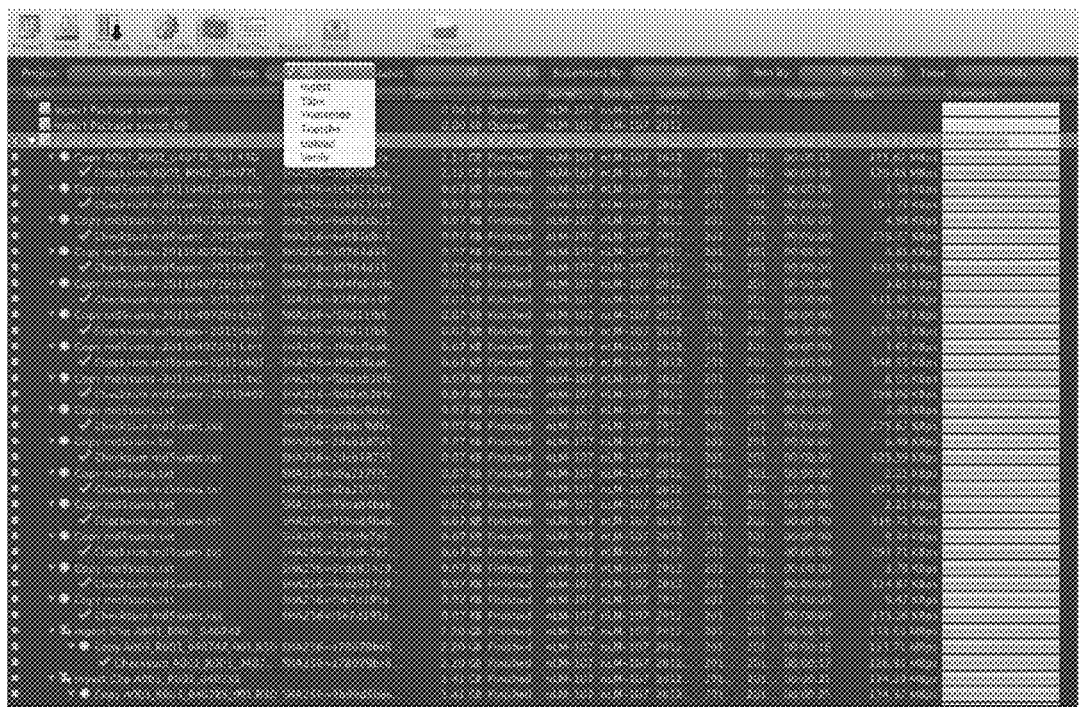
FIG. 12 is an embodiment of an illustrative graphical user interface displaying file progress and status, in various operational modes, in accordance with the present disclosures.

FIG. 12 shows an embodiment of an illustrative graphical user interface depicting function or "job" progress of defined project preferences and workflow profiles, once initiated, in accordance with the present disclosures. This graphical user interface can identify (but not be limited to) progress and status of multiple or specific tasks (i.e. ingest, transcode, duplicate, transfer, upload, archive, file verification); confirmation of master checksums as applied to duplicate media; display of data file volume; display of function progress as represented by fill bar; function result as represented by dots view; and more.

Figure 13:
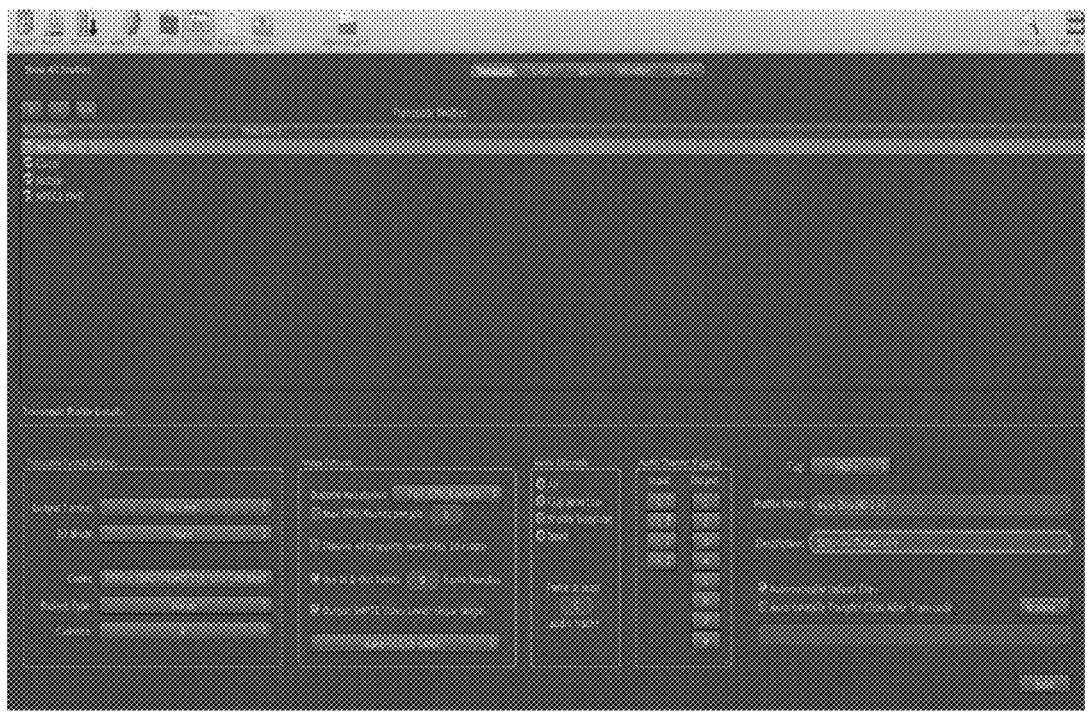
FIG. 13 is an embodiment of an illustrative graphical user interface for the selection of individual workflow profiles in accordance with the present disclosures.

FIG. 13 shows an embodiment of an illustrative graphical user interface for project profile preference selections in accordance with the present disclosures. Profile selections can include, but not be limited to: proxy media file types and configurations; proxy media aspect ratio assignments; metadata assignments for visual display in proxy media; profile assignments to specific project workflows; metadata assignments to Avid Log Exchange (ALE) files; and more.

Figure 14:
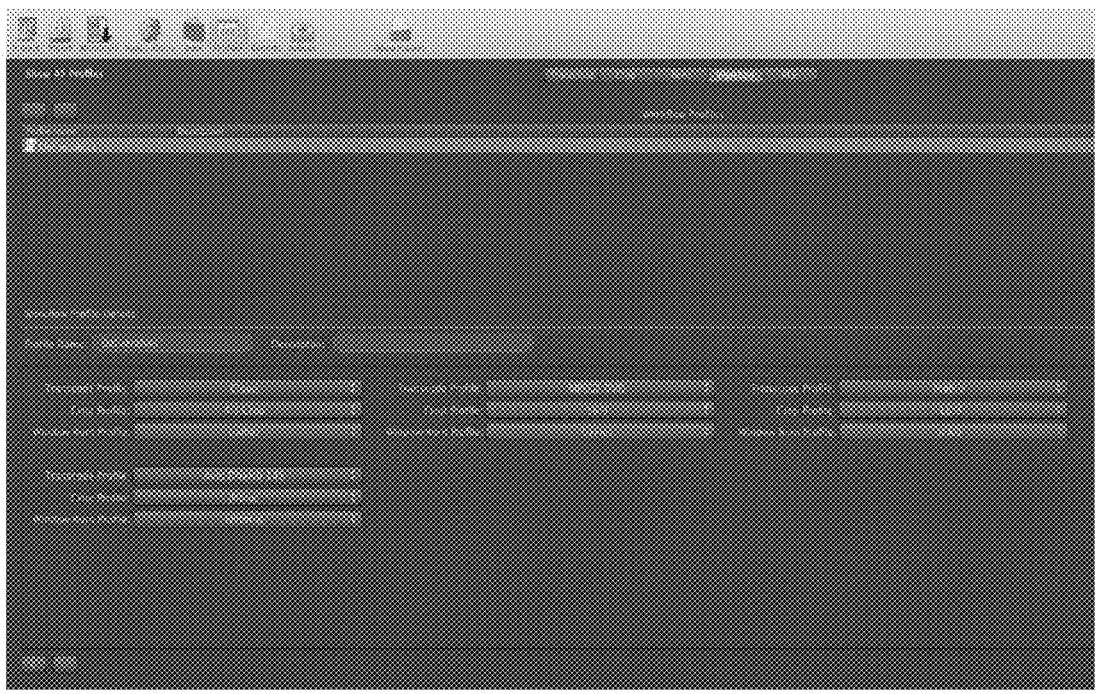
FIG. 14 is an embodiment of an illustrative graphical user interface for the assigning of various workflow profiles to a specific workflow in accordance with the present disclosures.

FIG. 14 shows another embodiment of an illustrative graphical user interface for project profile and workflow assignment in accordance with the present disclosures. This view can illustrate the ability to combine multiple profile preferences into single workflow assignments, which can direct various defined functions to take place simultaneously and in conjunction with specific workflow execution commands, and more.

Figure 15:
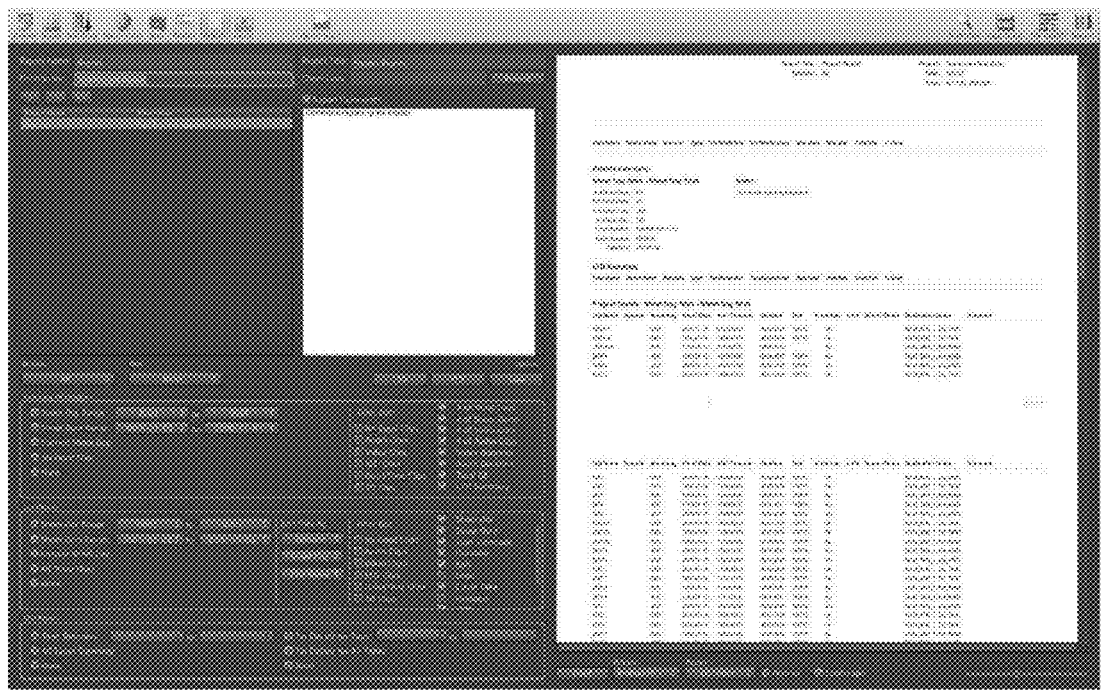
FIG. 15 is an embodiment of an illustrative graphical user interface for metadata assignments to automated reports generation in accordance with the present disclosures.

FIG. 15 shows an embodiment of an illustrative graphical user interface for metadata assignments to automated report generation. By selecting a number of metadata options, custom reports can be outlined for project administration and asset tracking. Metadata selections can include, but not be limited to, project and episode naming, shoot day identification, total data volume of media acquired per shoot day, total run time of media acquired per shoot day, file names, archive information which can include specific file addresses within TAR block assignments in an LTO archival tape, identification of proxy media generated per shoot day, identification of duplicate source and/or child files created per shoot day, location/s of source, child, and proxy media created per shoot day, device ID of file record devices used for non networked file transport, identification of select takes for editorial applications, project comments, and more, as examples.

Various embodiments have been described. However, one skilled in the art will recognize that the embodiments detailed here are merely examples used to illustrate the inventive concept(s), which can be embodied in various configurations and implementations. Thus, for example, in one embodiment, the above disclosure describes a method and computer-readable media comprising instructions for a method comprising: receiving, via the first computing device, a plurality of acquisition files, wherein each respective acquisition file of the plurality of acquisition files is received from a respective one media device of a plurality of media devices; creating, via the first computing device, for each respective acquisition file of the plurality of acquisition files, a respective normalized media object of a plurality of normalized media objects, the respective normalized media object comprising a reference to a respective acquisition file and respective first metadata, the respective first metadata relating to respective properties of the respective acquisition file; creating, via the first computing device, at least one universal media object, the at least one universal media object comprising a reference to at least one normalized media object of the plurality of normalized media objects and respective second metadata relating to respective first editorial adjustments to the respective universal media object performed via the first computing device; storing, via the first computing device, each respective acquisition file of the plurality of acquisition files, the plurality of normalized media objects and the at least one universal media object to a database; receiving, via a second computing device, respective second editorial adjustments to the at least one universal media object; and updating, via the second computing device, the at least one universal media object to reflect the respective first editorial adjustments and the respective second editorial adjustments.

In another embodiment, the above disclosure describes a system comprising: a database, a processor and a storage medium for tangibly storing thereon program logic for execution by the processor. The program logic comprises: logic for receiving a plurality of acquisition files, wherein each respective acquisition file of the plurality of acquisition files is received from a respective one media device of a plurality of media devices; logic for creating, for each respective acquisition file of the plurality of acquisition files, a respective normalized media object of a plurality of normalized media objects, the respective normalized media object comprising a reference to a respective acquisition file and respective first metadata, the respective first metadata relating to respective properties of the respective acquisition file; logic for creating, at least one universal media object, the at least one universal media object comprising a reference to at least one normalized media object of the plurality of normalized media objects and respective second metadata relating to respective first editorial adjustments to the respective universal media object performed via the first computing device; logic for transcoding each acquisition file of the plurality of acquisition files such that each respective transcoded acquisition file is compatible with a platform of a second computing device; logic for creating for each respective acquisition file, a respective child normalized media object associated with the respective normalized media object to which the respective acquisition file relates, wherein the respective child normalized media object comprises a reference to the respective transcoded acquisition file and respective third metadata, the respective third metadata comprising compatibility instructions relating to the platform of the second computing device; and logic for storing each respective acquisition file of the plurality of acquisition files, the plurality of normalized media objects and the at least one universal media object to a database.

All patents, patent applications, and published references cited herein are hereby incorporated by reference in their entirety. While the methods of the present disclosure have been described in connection with the specific embodiments thereof, it will be understood that it is capable of further modification. Furthermore, this application is intended to cover any variations, uses, or adaptations of the methods of the present disclosure, including such departures from the present disclosure as come within known or customary practice in the art to which the methods of the present disclosure pertain, and as fall within the scope of the appended claims. In various embodiments, hardwired circuitry can be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations that are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A method comprising:
   receiving, via the first computing device, a plurality of acquisition files, wherein each acquisition file of the plurality of acquisition files is received from a media device;
   creating, via the first computing device, a plurality of normalized media objects, each of the plurality of normalized media objects comprising a reference to an acquisition file of the plurality of acquisition files and a first metadata relating to properties of the referenced acquisition file;
   creating, via the first computing device, a universal media object, the universal media object comprising a reference to a normalized media object of the plurality of normalized media objects and a second metadata relating to a first editorial adjustment performed via the first computing device;
   storing, via the first computing device, the plurality of acquisition files, the plurality of normalized media objects and the universal media object to a database; and
   sharing, with a second computing device, an acquisition file of the plurality of acquisition files, the normalized media object having a reference to the shared acquisition file, and the universal media object having a reference to the normalized media object, such that the second computing device is caused to create a child media object using the shared acquisition file, the first metadata associated with the normalized media object, and the second metadata associated with the universal media object.

2. The method of claim 1, further comprising:
   transcoding, via the first computing device, an acquisition file of the plurality of acquisition files such that the transcoded acquisition file is compatible with a platform of the second computing device;
   creating, via the first computing device, for the transcoded acquisition file, a child media object associated with the normalized media object having a reference to the acquisition file, wherein the child media object comprises a reference to the transcoded acquisition file and compatibility instructions relating to the platform of the second computing device.

3. The method of claim 1 wherein the child media object is in a second format different from a format of the shared acquisition file associated with the universal media object.

4. The method of claim 3 wherein the second format is a proprietary format associated with a platform on the second computing device.

5. The method of claim 4 wherein the proprietary format associated with the platform on the second computing device comprises a codec and a file wrapper.

6. The method of claim 1 further comprising:
   receiving, via the first computing device, a third metadata relating to a second editorial adjustment;
   updating, via the first computing device, the universal media object to reflect the second editorial adjustment; and
   sending, to the second computing device, the third metadata, such that the second computing device is caused to create the child media object using the shared acquisition file, the first metadata, the second metadata, and the third metadata.

7. The method of claim 6 wherein:
   at least two versions of the universal media object are created,
   the first version of the universal media object comprising a reference to the normalized media object and the second metadata relating to the first editorial adjustment to the universal media object; and
   the second version of the universal media object comprising a reference to the normalized media object and the second metadata relating to the first editorial adjustment to the universal media object and the third metadata relating to the second editorial adjustment to the universal media object.

8. The method of claim 7 wherein the first version of the universal media object and the second version of the universal media object are separately accessible by each of the first computing device and the second computing device.

9. The method of claim 7 further comprising:
   creating, via the first computing device, for the first version of the universal media object, a normalized media object fingerprint that uniquely identifies the first version of the universal media object; and
   creating, via the first computing device, for the second version of the universal media object, a normalized media object fingerprint that uniquely identifies the second version of the universal media object.

10. The method of claim 1 wherein each acquisition file of the plurality of acquisition files is one of a data type selected from: picture, sound, metadata, and ancillary production data.

11. The method of claim 1 wherein each acquisition file of the plurality of acquisition files is a master file of a data type selected from: 2D or 3D, frame rate, resolution, codec, and duration.

12. The method of claim 1 further comprising:
   determining, via the first computing device, for each acquisition file of the plurality of acquisition files, a first checksum when the acquisition file is received;
   determining, via the first computing device, for each acquisition file of the plurality of acquisition files, a second checksum for the acquisition file after the acquisition file is stored to the database; and
   verifying, via the first computing device, for each acquisition file of the plurality of acquisition files, the first checksum for the acquisition file matches the second checksum for the acquisition file.

13. The method of claim 12 wherein the second editorial adjustment is a color adjustment to the acquisition file based on one of: a color decision list and a color lookup table.

14. The method of claim 1 further comprising:
   determining, via the first computing device, a match between a first acquisition file of the plurality of acquisition files and a second acquisition file of the plurality of acquisition files; and
   in response to a determined match between the first acquisition file and the second acquisition file, updating the universal media object, via the first computing device, to comprise references to the first acquisition file and the second acquisition file and synchronization data.

15. The method of claim 14 wherein the step of determining comprises matching a first time code associated with the first acquisition file with a second time code associated with the second acquisition file.

16. The method of claim 14 wherein the step of determining comprises matching a first audio waveform associated with the first acquisition file with a second audio wave form associated with the second acquisition file.

17. The method of claim 14 wherein the step of determining comprises matching the first metadata associated with the first acquisition file with the first metadata associated with the second acquisition file.

18. The method of claim 14 further comprising:
receiving, via the first computing device, from a user, a synchronization adjustment to the synchronization data.

19. The method of claim 18 wherein the synchronization adjustment is one of: a time code, camera relationship, filename, a frame increment, a sub-frame increment, a microsecond, a sample size, and a synchronization relationship.

20. The method of claim 1 wherein the properties of the acquisition file comprise at least one of: frame rate, image information, colorspace, timebase, tape name and codec.

21. The method of claim 1 wherein the first editorial adjustment is an identification of a circle-take.

22. The method of claim 1 wherein the first editorial adjustment is a color adjustment.

23. The method of claim 22 wherein the color adjustment comprises at least one of: lift, gamma, gain, and saturation.

24. The method of claim 22 wherein the color adjustment to the acquisition file is based on at least one of: a color decision list and a color lookup table.

25. The method of claim 1 further comprising:
defining, via the first computing device, a project, the project comprising workflow preferences relating to the first computing device and a second computing device.

26. The method of claim 25 further comprising:
creating, via the first computing device, an aggregated data object using the universal media object and the workflow preferences.

27. The method of claim 26 wherein the workflow preferences comprise at least one of:
identification of proxy media and transcode formats for post production and dailies media,
automated transfer destinations for received media and transcoded files,
audio channel selections,
audio channel mapping,
file trim settings,
proxy media image crop settings, and
metadata selections for proxy media burn-in.

28. The method of claim 1 further comprising:
creating, via the first computing device, an aggregated collection of data objects using the universal media object.

29. The method of claim 1 further comprising:
receiving, via a second computing device, a third metadata relating to a second editorial adjustment; and
updating, via the second computing device, the universal media object to reflect the second editorial adjustment.

30. The method of claim 29 further comprising:
receiving, via a plurality of third computing devices, a plurality of third editorial adjustments to the universal media object; and
updating, via the plurality of third computing devices, the universal media object to reflect the first editorial adjustment, the second editorial adjustment, and the plurality of third editorial adjustments.

31. The method of claim 1 wherein the second metadata is keyframed down to a time interval.

32. The method of claim 31 wherein the time interval is equal to or greater than a microsecond.

33. The method of claim 31 wherein the time interval is determined using a value seeded in one of the plurality of acquisition files.

34. The method of claim 31 wherein the time interval is determined using a value in the first editorial adjustment.

35. The method of claim 1 further comprising:
creating, via the first computing device, for each normalized media object of the plurality of normalized media objects, a normalized media object fingerprint that uniquely identifies the normalized media object.

36. The method of claim 35 wherein each normalized media object fingerprint is created using a hashing algorithm using a file attribute of the acquisition file and the first metadata relating to properties of the acquisition file.

37. The method of claim 36 further comprising:
determining, via the first computing device, that a first normalized media object of the plurality of normalized media objects is a duplicate of a second normalized media object of the plurality of normalized media objects using the normalized media object fingerprint of the first normalized media object and the normalized media object fingerprint of the second normalized media object.

38. A system for providing distributed work flow to film production, the system comprising:
a database for storing a plurality of acquisition files received from a media device, for storing a normalized media object for each stored acquisition file, each normalized media object including a first metadata relating to a property of one of the stored acquisition files, and for storing a universal media object, the universal media object including a reference to one of the stored normalized media objects and a second metadata relating to a first editorial adjustment to media content of one of the stored acquisition files, wherein an acquisition file of the plurality of acquisition files is configured to be shared, the normalized media object has a reference to the shared acquisition file, and the universal media object has a reference to the normalized media object such that a child media object may be created using the shared acquisition file, the first metadata associated with the normalized media object and the second metadata associated with the universal media object; and
a media adaptor disposed remotely across a computer network from the database, the media adaptor for duplicating, in a storage unit locally disposed with the media adaptor, the plurality of stored acquisition files, the normalized media objects and the universal media object, and for updating the first and second metadata according to a second editorial adjustment to media content of the duplicated acquisition files.

39. The system of claim 38 further comprising:
a media indexer locally disposed with the media adaptor, the media indexer for allocating metadata storage in the database in accordance with the second editorial adjustment to media content of the duplicated acquisition files.

40. The system of claim 39 wherein the media indexer allocates metadata storage in the database in accordance with the first metadata associated with a normalized media object and the second metadata associated with the universal media object, the first and second metadata being updated by a processor locally disposed with the media indexer.

41. The system of claim 40 wherein the media indexer allocates metadata storage in the database when a checksum of a stored acquisition file is different from a checksum of a duplicated acquisition file.

42. The system of claim 40 wherein the media indexer allocates metadata storage in the database when a platform compatibility of a stored normalized media object is different from a platform compatibility of a duplicated normalized media object.

43. The system of claim 40 wherein the media indexer allocates metadata storage in the database when metadata relating to editorial adjustment of a stored universal media object is different from metadata relating to editorial adjustment of a duplicated universal media object.

44. A system comprising:
   a database;
   a processor;
   a storage medium for tangibly storing thereon program logic for execution by the processor, the program logic comprising:
   logic for receiving an acquisition file;
   logic for creating, a normalized media object comprising a reference to the acquisition file and a first metadata, the first metadata relating to the acquisition file;
   logic for creating, a universal media object comprising a reference to the normalized media object of the plurality of normalized media object and a second metadata, the second metadata relating to a first editorial adjustment to the universal media object;
   logic for transcoding the acquisition file such that the transcoded acquisition file is compatible with a platform of a computing device;
   logic for creating, for the acquisition file, a child normalized media object associated with the normalized media object to which the acquisition file relates, the first metadata associated with the normalized media object, and the second metadata associated with the universal media object, wherein the child normalized media object comprises a reference to the transcoded acquisition file and a third metadata, the third metadata comprising a compatibility instruction relating to the platform of the computing device; and
   logic for storing the acquisition file, the normalized media object and the universal media object to the database.

45. A computer-readable storage medium storing tangible encoding instructions, which, when executed by a computing device, perform a method comprising:
   receiving, via the computing device, a plurality of acquisition files, wherein each acquisition file of the plurality of acquisition files is received from a media device;
   creating, via the computing device, a plurality of normalized media objects, each of the plurality of normalized media objects comprising a reference to an acquisition file of the plurality of acquisition files and a first metadata relating to properties of the referenced acquisition file;
   creating, via the computing device, a universal media object, the universal media object comprising a reference to a normalized media object of the plurality of normalized media objects and a second metadata relating to a first editorial adjustment performed via the computing device;
   storing, via the computing device, the plurality of acquisition files, the plurality of normalized media objects and the universal media object to a database; and
   sharing, with a second computing device, an acquisition file of the plurality of acquisition files, the normalized media object having a reference to the shared acquisition file, and the universal media object having a reference to the normalized media object, such that the second computing device is caused to create a child media object using the shared acquisition file, the first metadata associated with the normalized media object, and the second metadata associated with the universal media object.

* * * * *